Figure 1:
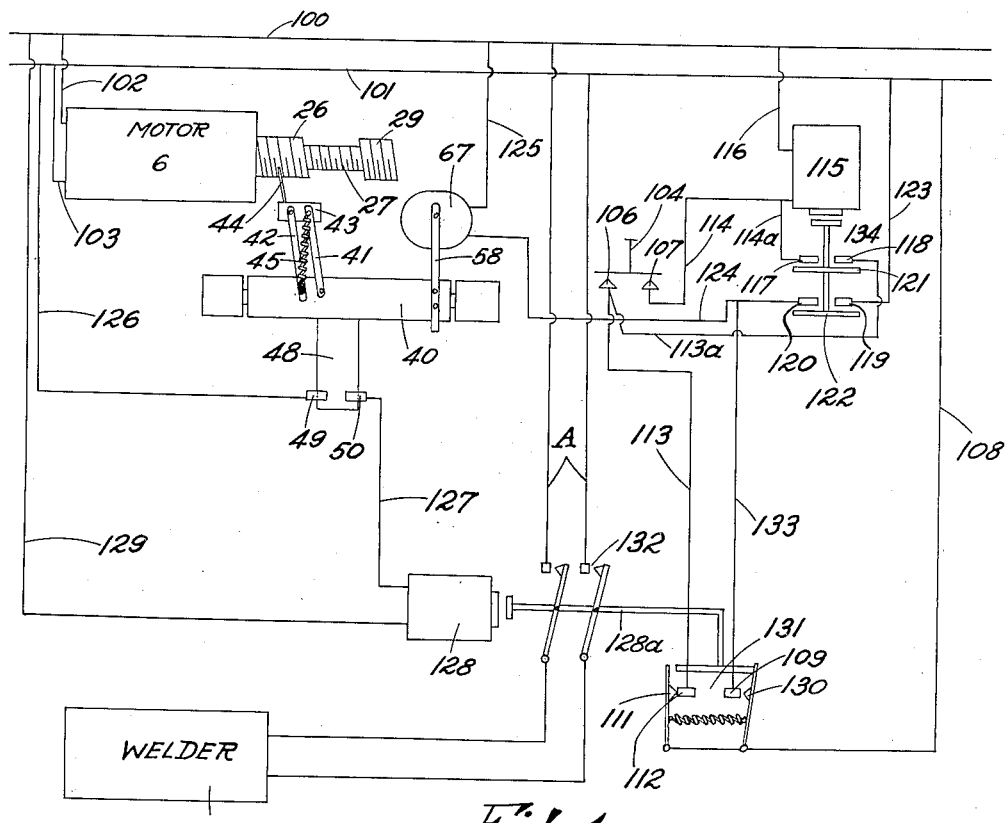

April 4, 1939. D. I. BOHN 2,152,631
WELDING TIMER
Filed Feb. 23, 1937 3 Sheets-Sheet 1

INVENTOR.
DONALD I. BOHN
Richey + Watts
ATTORNEYS

April 4, 1939. D. I. BOHN 2,152,631
WELDING TIMER
Filed Feb. 23, 1937 3 Sheets-Sheet 2

INVENTOR.
DONALD I. BOHN
BY Richey & Watts
ATTORNEYS

April 4, 1939.  D. I. BOHN  2,152,631
WELDING TIMER
Filed Feb. 23, 1937  3 Sheets-Sheet 3

INVENTOR.
DONALD I. BOHN
BY
ATTORNEYS

Patented Apr. 4, 1939

2,152,631

UNITED STATES PATENT OFFICE 2,152,631

WELDING TIMER

Donald I. Bohn, Pittsburgh, Pa.

Application February 23, 1937, Serial No. 127,036

13 Claims. (Cl. 219—4)

This invention relates broadly to the art of welding, and is particularly concerned with intermittent welding apparatus having means for controlling the time interval during which welding current is permitted to flow between the electrodes of the welder, and for turning the current on and off at predetermined points on the alternating current wave of the power supply.

Intermittent welding apparatus for certain uses requires the flow of a heavy current. Since arcing at the switch can be prevented if the switch is opened when the current is in the vicinity of its zero point, it is highly desirable to provide means for opening the welding current switch of such a welding apparatus at predetermined points on the alternating current wave. In certain types of welding, it is desirable that the welding current should flow for a very short interval of time and hence it is necessary to provide apparatus which will open the welding circuit at the end of a predetermined number of cycles. It is also equally important that the closing of the circuit be done at a certain point on the voltage wave in order to avoid unsymmetrical transients, which result if this is not done. A timer for this work, to be satisfactory, must be adjustable, so that the welding circuit may be closed or opened at preset points on the voltage and current waves, must permit an adjustment for any number of cycles, and must maintain these adjustments with a high degree of accuracy.

Heretofore, devices have been provided for opening and closing switches in the welding circuits of intermittent welders at times when the current was at or near zero and for controlling the time interval during which such switches are closed. All such prior devices, so far as I am aware, have either been quite complicated and expensive or have been difficult to adjust and maintain in proper adjusted condition. Such devices may be roughly divided into two classes, namely, electronic apparatus and electro-mechanical apparatus. The electronic apparatus is highly complicated electrically and is quite expensive and its cost is so great as to be prohibitive with many types of intermittent welders. The electro-mechanical devices are somewhat complicated mechanically, are difficult to adjust and maintain in proper adjusted condition, and are not adapted to limit the time of flow of a heavy welding current to the extremely short period of time required for many types of welding.

The present invention provides a timer, for use in combination with an intermittent welder, which is simple in construction, relatively low in cost, simple and easy to adjust so as to open and close the welding current circuit at the proper points on the alternating current wave, maintain such adjustment, and be capable of actuating the welding current switch so as to permit welding current to flow for very small intervals of time such as from one or two cycles to several cycles of current of commercial frequency.

Figure 5:
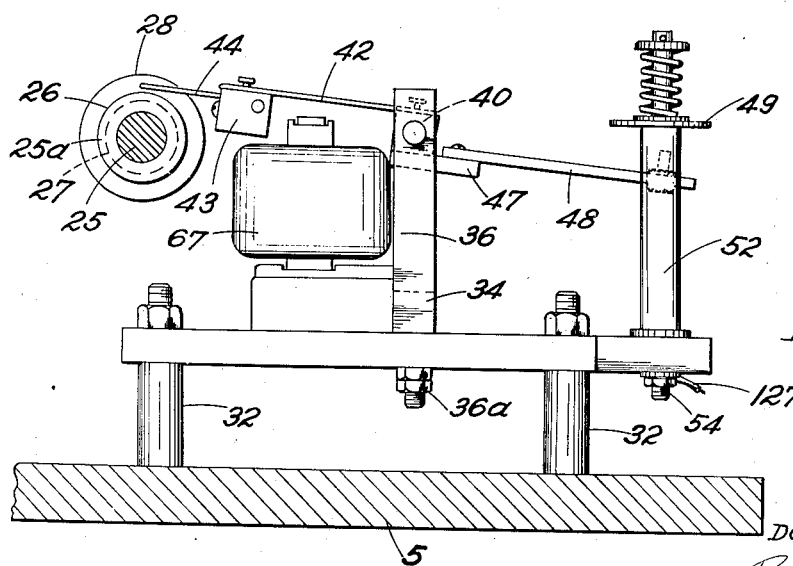
Figure 2:
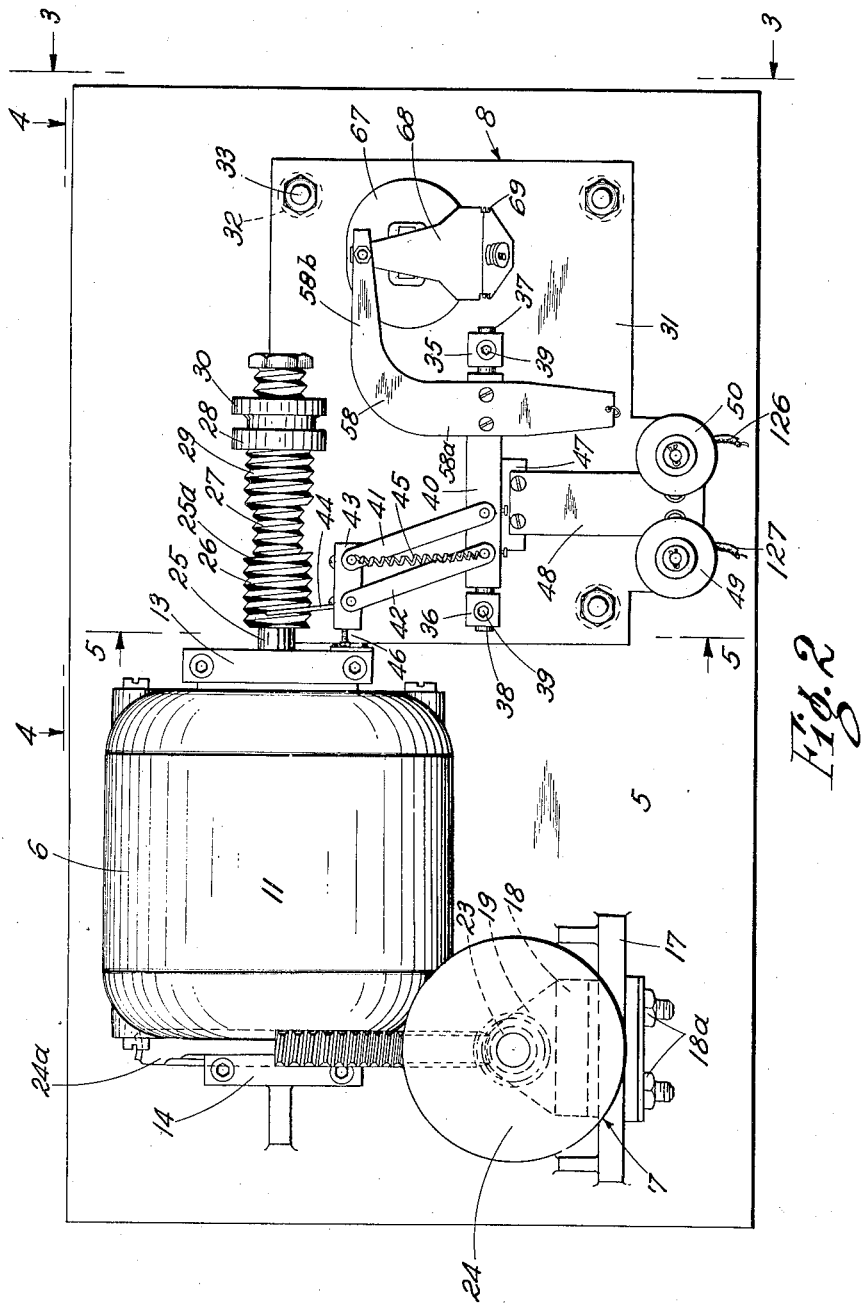
Figure 3:
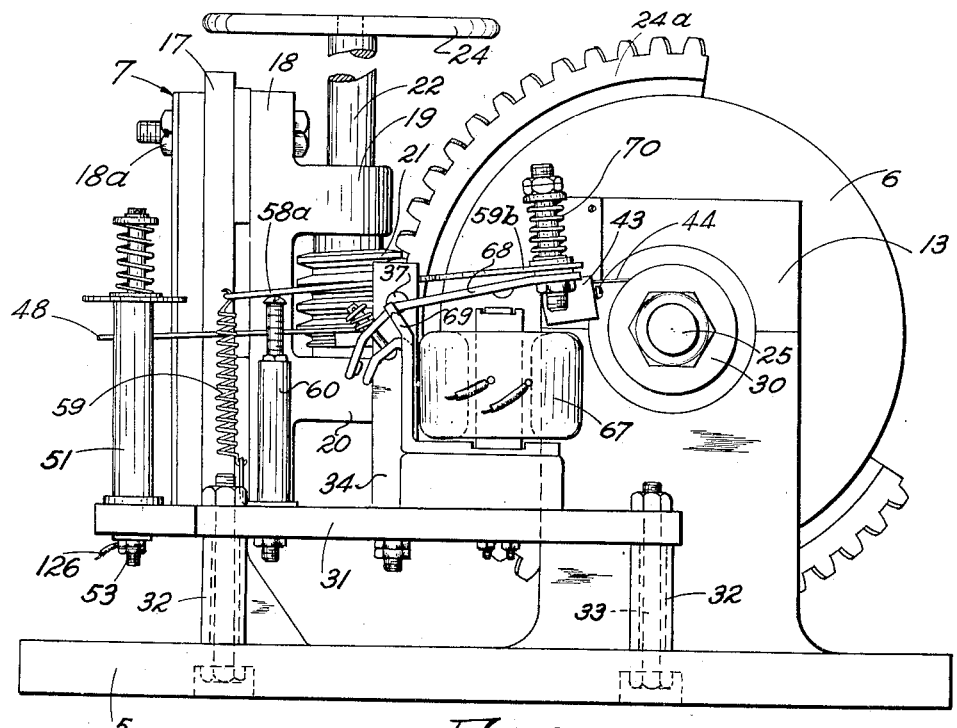
Figure 4:
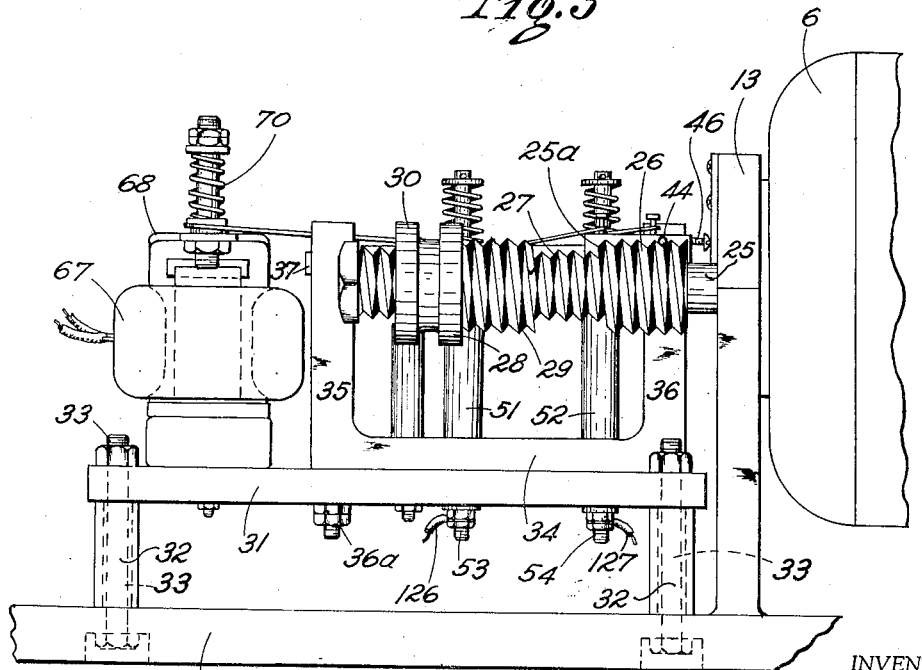

The foregoing and other advantages of the invention and the invention itself will become more apparent from the following detailed description taken in conjunction with the accompanying drawings wherein similar reference characters denote corresponding parts and wherein:

Figure 1 is a diagrammatic view of apparatus embodying the present invention and including an intermittent welder, a timer and a wiring diagram, Figure 2 is a top plan view of the welding timer, Figure 3 is an end elevational view of the timer taken on the line 3—3 of Figure 2, Figure 4 is a fragmentary side elevational view of the timer taken on line 4—4 of Figure 2, and Figure 5 is a transverse sectional view taken on the line 5—5 of Figure 2.

In Figure 1 of the drawings there is diagrammatically illustrated the timing device of the present invention operatively associated with the switch of the main welding circuit "A" which supplies current to an intermittent welder "B". One form of this timing device is illustrated in Figures 2 to 5 inclusive, and includes a base 5 upon which is mounted a synchronous motor 6 for rotating a spiral cam 25a, a stator shifting mechanism 7 for synchronizing the rotation of the spiral cam driven by the motor 6 with the main welding current supplied to the intermittent welder "B", and the welding current switch control mechanism broadly indicated by the numeral 8.

The synchronous motor 6 is supported on the base 5 by means of spaced upstanding brackets 13 and 14 secured to the base 5. The brackets 13 and 14 are provided with aligned apertures which rotatably receive hub-like extensions formed on the opposite ends of the stator casing 11 of the motor 6.

Associated with the motor 6 is the stator shifting mechanism 7 for synchronizing the rotation of the spiral cam driven by the motor 6 with the welding current supplied to the intermittent welding machine "B" (Figure 1) and consists of a vertically disposed supporting member 17 integrally formed with the base 5, to which is secured, by means of bolts 18a, a bracket member 18. The bracket member 18 is formed with spaced parallel horizontally extending lugs 19 and 20. A worm gear 21 is positioned between the lugs 19 and 20, one end of which seats within a bearing recess formed in the lug 20. The worm gear 21 has pinned thereto, a vertical shaft 22 which extends upwardly through an opening 23 in the lug 19 and has formed on its free end a hand wheel 24 for effecting rotation of the worm gear 21. Secured to the stator casing 11 of the motor 6 is a fragmentary gear wheel 24a which is so positioned as to mesh with the worm gear 21. The synchronization of the rotation of the spiral cam 25a driven by motor 6 with the current supplied to the welding machine is effected by rotation of the hand wheel 24 of the stator shifting mechanism 7 which, in turn, rotates the stator casing 11.

Formed on the extension of the rotor shaft 25 of the motor 6 is the spiral cam 25a having threaded portions 26, 27 and 29 of different diameters. The portions 26 and 29 will be called the pre-welding and post-welding portions, respectively, of the cam. The portion 27 of the cam which is between and of smaller diameter than either of the portions 26 and 29 will be called the welding diameter of the cam. The post-welding portion 29 of the cam is formed on the shank portion of an adjusting sleeve 28 which is threaded on the portion 27 of the cam 25a. A lock nut 30 is provided to secure the adjusting sleeve in predetermined position with respect to the welding portion of the cam.

Alternating current is supplied to the motor 6 from the supply lines 100 and 101 through lead lines 102 and 103 and the motor is continuously running during the operation of the device and thus continuously rotating the spiral cam 25a on the rotor shaft 25. The pre-welding portion 26 of the spiral cam 25a is adapted to receive a cam follower 44 and move it axially of the shaft 25 until it engages the welding portion 27 of the cam. Simultaneously with the passage of the cam follower 44 from the pre-welding portion 26 to the welding portion 27 a circuit is completed to a magnet 128 which operates the main welding current switch 132 and the double throw interlock 131, through an armature arm 128a which is pivotally connected to the contact arms of the switch 132, the end of which arm engages the contact arms of the interlock 131. With reference to Figure 1, this circuit is from one supply line 101, through line 126, across contacts 49 and 50, through line 127, to one side of the magnet 128; and thence to the other supply line 100 through the line 129.

The length of time during which current is permitted to flow to the welder is determined by the number of convolutions of the welding portion 27 of the spiral cam 25a which the cam follower 44 is permitted to engage. For example, each revolution of the welding portion 27 represents a predetermined number of cycles of current passing to the welding machine, and the adjusting sleeve 28 can be positioned with respect to the pre-welding portion 26 so that the cam follower will engage the portion 27 for any desired number of revolutions thereof. When the cam follower 44 engages the threads of the portion 29 and is lifted out of the threads of the portion 27, the circuit is broken to the magnet 128 across the contacts 49 and 50, and simultaneously therewith, the main welding current switch 132 is opened and current ceases to flow to the welding machine.

The welding current switch control mechanism 8 is mounted on a plate 31, spaced from the base 5 by means of sleeves 32 encircling headed bolts 33. Secured to the plate 31 by means of bolt 36a is a frame 34, the upper free ends 35 and 36 of which, have associated therewith, inwardly extending trunnion pins 37 and 38, respectively. The trunnion pins are maintained within aligned openings extending through the ends 35 and 36, by means of set screws 39. Pivotally mounted on the pins 37 and 38 is a rectangular rocking shaft 40. The shaft 40 has pivotally mounted thereon a pair of transverse parallel arms 41 and 42, the outer free ends of which support a traveling member 43. The elongated pin or cam follower 44 extends outwardly from the member 43 and is positioned to engage the spiral cam 25a formed on the rotor shaft 25. A spring 45 extending between the opposite ends of the parallel arms 41 and 42 serves to return the member 43 to its original position after it has been moved in response to the engagement of the cam follower 44 with the spiral cam 25a. An adjustable stop 46 carried by the member 43 and engageable with support 13 limits the return movement of the member 43.

The rocking shaft 40 has secured to its bottom surface a non-conducting plate 47 to which is attached a contact arm 48. Rotation of the rocking shaft 40 brings the pin or cam follower 44 into engagement with the pre-welding portion 26 of the spiral cam 25a. The pin follows along the portion 26 until the end of it is reached at which instant it drops into the welding portion 27, and simultaneously therewith, the contact arm 48 engages contact plates 49 and 50 resiliently carried on the free ends of the posts 51 and 52, respectively. The terminal posts 51 and 52 are secured to the plate 31 and have terminals 53 and 54, respectively, extending through and disposed beneath the plate 31. The terminal 53 is connected to the line 126 and terminal 54 is connected to line 127.

The arm 58a of an angulated plate 58 is mounted on the upper surface of the rocking shaft 40. The end of the arm 58a is resiliently urged downwardly by means of spring 59 which extends between the end of the arm and the plate 31. An adjustable stop 60 mounted on the plate 31 prevents downward movement of the arm beyond a predetermined point.

Mounted on the plate 31 is an electromagnet 67. An arm 68 pivoted as at 69 extends across the core of the magnet and is adapted to be moved downwardly when the magnet is energized. The free end of the arm 68 is resiliently connected to the end of arm 59b of the plate 58 through a spring connection 70. Current to the magnet 67 flows from the supply line 101, through line 123, across contact arm 122 between the contacts 119 and 120 of a relay 134, thence through line 124 to one terminal of the magnet 67. The other terminal of the magnet is connected to the supply line 100 through line 125.

The flow of current to the relay 134 is controlled by a hand switch 104 which when depressed closes a circuit from the supply line 101, through the line 108, across the contacts 111 and 112 of the overlapping interlock 131, through line 113, across the contacts 106 and 107 of switch 104, through line 114 to one side of the coil 115 of the relay 134. The other side of the coil 115 is connected to the supply line 100 through line 116. Energizing the coil 115 of the relay 134 closes the circuit to the magnet 67, above described. Simultaneously, the contact arm 121 of the relay 134 closes the contacts 117 and 118 which completes a parallel circuit to the relay coil 115, so that current will continue to flow to the coil when the hand switch 104 has been released. This circuit is from the supply line 101, through line 108, across the contacts 111 and 112 of overlapping interlock 131, through line 113 to contact 106, of hand switch 104, thence through line 113a to contact 118, contactor arm 121, contact 117, line 114a to line 114.

When the main welding switch 132 is closed the circuit to the relay coil 115 is broken at the interlock 131 at contacts 111 and 112. However, before these contacts are broken, contacts 130 and 109 of the interlock 131 are brought into engagement so as to complete a circuit and continue the flow of current to the electromagnet 67, the first circuit to the magnet having been broken when the relay 115 was de-energized. This circuit is from supply line 101, through line 108, contacts 109 and 130, through lines 133, and 124 to one terminal of the magnet 67. Thus current is flowing to the magnet during the time when the main welding switch 132 is closed. When the switch 132 is again opened the engagement of the contacts 109 and 130 is broken and the magnet 67 releases the arm 58 permitting the cam follower 44 to be returned to its original position.

When the operation of the apparatus is started the motor 6 having been previously adjusted to synchronize the rotation of the spiral cam with the main welding current is continuously rotating the spiral cam 25a. The hand switch 104 is momentarily depressed. This energizes relay coil 115, the circuit being from the power supply line 101 through line 108 to contact 111, which is engaging contact 112; thence through line 113 to contact 106, across push button 104 to contact 107, through line 114 to one side of relay coil 115; and thence to the other supply line 100 through line 116. This operation picks up relay 134, closing two pairs of contacts. One of these contacts consists of member 121 connecting contacts 117 and 118, which provides a sealing-in circuit for relay coil 115 by paralleling push button contacts 106 and 107 through lines 113a, 114a and 114. This permits the operator to release push button 104 without dropping out relay 134. Simultaneously, with the closing in of relay 134 as described, magnet 67 is energized from power line 101 through line 123 to contact 119, member 122 and contact 120, through line 124 to one side of magnet 67; and thence through line 125 to the other power line 100.

The energization of magnet 67 causes a downward movement of its magnet armature and an angular rotation of rectangular rocking shaft 40. Rotation of the shaft 40 causes engagement of the cam follower 44 with the pre-welding portion 26 of the spiral cam 25a. Since the motor is in operation synchronously in the proper direction, this engagement causes the cam follower 44 to follow along the portion 26 of the cam 25a until the end of it is reached, at which instant, it drops into the welding portion 27 of the spiral cam 25a. This action permits a further angular rotation of the rectangular rocking shaft 40 causing the contacts 49 and 50 to be connected together through plate 48.

The engagement of contacts 49 and 50 by the plate 48 closes a circuit to the magnet 128. This energizes magnet 128 from power line 101 through line 126, across contacts 49 and 50 through line 127 to one side of the coil of magnet 128. The return circuit is from the other side of the coil of magnet 128 through line 129, to power supply line 100.

The energizing of coil 128 performs two functions simultaneously; it closes through a mechanical connection between armature 128a the main welding current switch 132 applying power to the welded "B"; and by a mechanical connection at the end of the armature arm 128a and the overlapping interlock 131 it closes contacts 130 and 109 just prior to opening contacts 111 and 112. The closing of contacts 109 and 130 provides a new parallel source of power for magnet 67, it starting with the power line 101, through line 108 to contact 130; thence to contact 109, through line 133, line 124 to one side of the coil magnet 67; the return from the other side of the coil of magnet 67 being through line 125 to the power supply line 100. The opening of contacts 111 and 112 opens the circuit to relay coil 115 so that relay 134 drops out.

In the meantime the cam follower 44 has followed along the welding portion 27 of the cam 25a for a preset number of cycles until it engages the end of the post-welding portion 29 of the cam 25a. When reaching the end of the portion 29 the cam followed is raised, causing a rotational movement of rectangular rocking shaft 40, this being permitted by spring connection 70 even though magnet 67 is not at this instant yet de-energized. This same action opens the circuit across the contacts 49 and 50, de-energizing the magnet 128 and opening main welding switch 132. Simultaneously therewith the contacts 130 and 109 are separated to open the circuit heretofore established to the magnet 67.

The operation of the interlock 131 also moves the contactors 111 and 112 into engagement with each other, completing part of the original pick-up circuit for relay 134, so that it will be ready for the next operation when hand switch 104 is closed. De-energizing of magnet 67 also permits a further rotation of rectangular rocking shaft 40 so that cam follower 44 clears all rotating parts and swings back to its original position in response to the spring 45.

Having thus described my invention what I desire to obtain by Letters Patent is defined in what is claimed.

What I claim is:

1. In a welding circuit, an electrically actuatable switch, a synchronous motor, a cam continuously actuated thereby, a cam follower engageable with and removable from said cam, and means operatively associated with said follower for actuating said switch during the time the follower is in engagement with a predetermined part of said cam.

2. In a welder circuit, a normally open switch, a circuit including a magnet, a synchronous motor, a cam continuously rotated thereby, a cam follower engageable with and removable from said cam, means controlled by said magnet and follower to close said switch, and means operative when the follower is in a predetermined position on said cam to open the said switch and magnet-containing circuit.

3. In a normally open welding circuit, an auxiliary circuit including a switch and an electrical device for closing said welding circuit, and means for completing said auxiliary circuit, said means including a synchronous motor, a cam continuously rotatable thereby, a follower selectively engageable with said cam, and means associated with the follower and operable during a part only of the time the follower engages the cam for closing the auxiliary circuit switch.

4. In a welding circuit, a magnet circuit including a magnet, an auxiliary circuit, electrical means in the auxiliary circuit to close said welding circuit, a synchronous motor, a cam continuously rotated thereby, a cam follower engageable with said cam, means operatively associated with said magnet and follower to close and to open said auxiliary circuit and means operative when the auxiliary circuit is opened to open the welding circuit and magnet circuit.

5. In a welding circuit, a magnet energizing circuit, a synchronous motor, a cam continuously rotated thereby, a cam follower engageable with said cam, means including said magnet for engaging said follower with said cam, means operable thruout the time the follower engages a predetermined part of said cam for closing the welding circuit, and means operable when the follower reaches a predetermined part of said cam for simultaneously breaking the welding circuit and magnet energizing circuit.

6. In a welding circuit, a switch, a magnet energizing circuit, a synchronous motor, a cam continuously rotated by said motor, a cam follower engageable with said cam, means including said magnet for engaging said follower with said cam for travel over a predetermined part of said cam, means controlled by said follower for completing said welding circuit thru its switch, means operable when the follower has reached a predetermined position on said cam to de-energize said magnet, means to disengage the follower and cam and means to return said follower to its initial position when said magnet has been de-energized.

7. In a welding circuit, a switch, an auxiliary circuit including a switch and an electrical device for closing said welding circuit switch, a synchronous motor, a cam actuated thereby, a cam follower engageable with said cam, means operatively associated with the switch of said auxiliary circuit for closing the circuit thru said switch during a part only of the time the follower engages said cam, and means including a relay circuit and a magnet therein for engaging the follower with said cam.

8. In a welding circuit, a switch, an auxiliary circuit including a switch and an electrical device for closing said welding circuit switch, a synchronous motor, a cam actuated thereby, a cam follower engageable with said cam, means operatively associated with the switch of said auxiliary circuit for closing the circuit thru said switch during a part only of the time the follower engages said cam, means including a relay circuit and a magnet therein for engaging the follower with said cam, and means operable when the follower reaches a predetermined place on said cam for opening said welding circuit and said relay circuit.

9. A timer, for an electric welder having a switch controlled welding circuit, including a synchronous motor, a cam continuously actuated thereby, a cam follower engageable with and removable from said cam, means to actuate said follower into engagement with said cam and electrical means controlled by said follower for closing the welding circuit switch during the time the follower engages a predetermined part of said cam.

10. A timer, for an electric welder having a switch controlled welding circuit, including a synchronous motor, a spirally grooved cam continuously rotated thereby, a cam follower engageable with the groove of said cam, manually controlled electrical means to actuate said follower into engagement with said cam, and electrical means controlled by said follower for closing the welder circuit switch during the time the follower engages a predetermined part of said cam.

11. A timer, for an electric welder having a switch controlled welding circuit, including a synchronous motor, a cam continuously rotated thereby, a cam follower engageable with the groove of said cam, manually controlled electrical means to actuate said follower into engagement with said cam, electrical means controlled by said follower for closing the welder circuit switch during the time the follower engages a predetermined part of said cam, and means for automatically disengaging said follower and said cam at a predetermined place on the latter and returning the follower to its initial position.

12. A timer, for an electric welder having a switch controlled welding circuit, including a synchronous motor, a spirally grooved cam continuously rotated thereby and having a welding portion of adjustable length and non-welding portions at each end of said welding portion, a cam follower engageable with said cam, and means operatively associated with said follower for completing the welding circuit through its switch thruout the time the follower engages said welding portion of said cam.

13. A timer, for a normally open welding circuit, including a synchronous motor, a cam continuously rotated thereby and having a welding portion and non-welding portions, a follower engageable with and removable from said cam, electrical circuit closing means operatively associated with said follower for closing said welding circuit thruout the time the follower engages the welding portion of the cam and means for opening said welder circuit when said follower is moved out of engagement with said welding portion of said cam.

DONALD I. BOHN.